Beebe & Smith.
Railroad Track Iron.
Nº 17,478.  Patented Jun. 9, 1857.
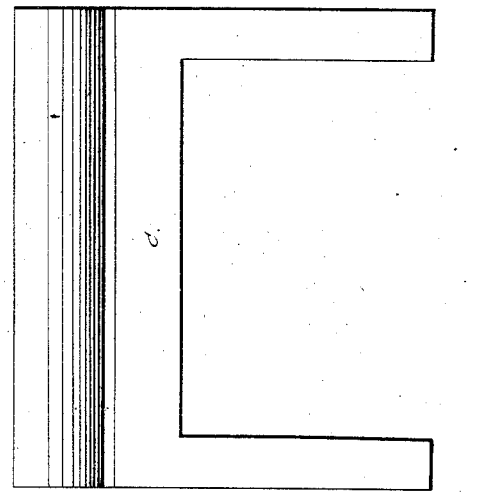
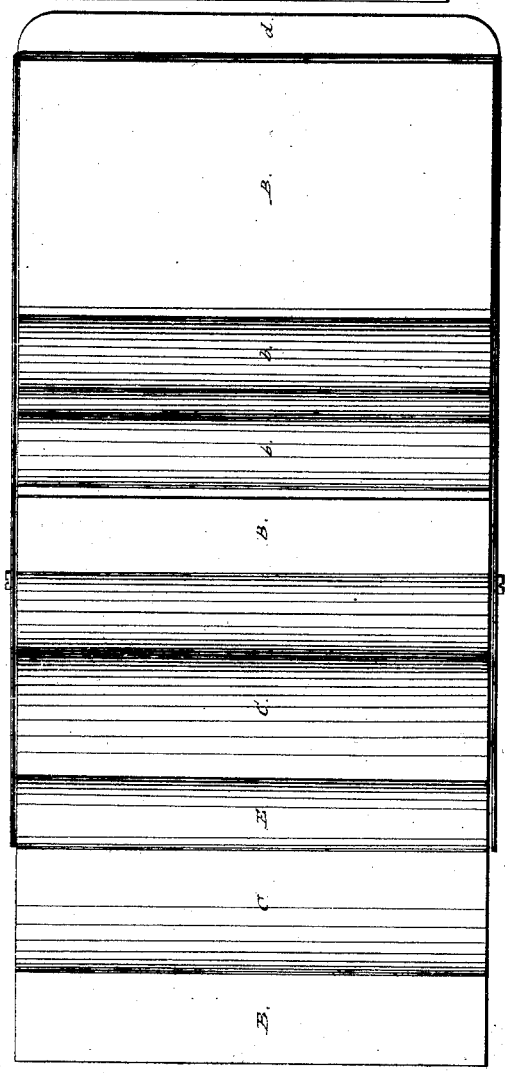
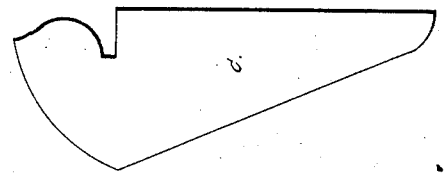
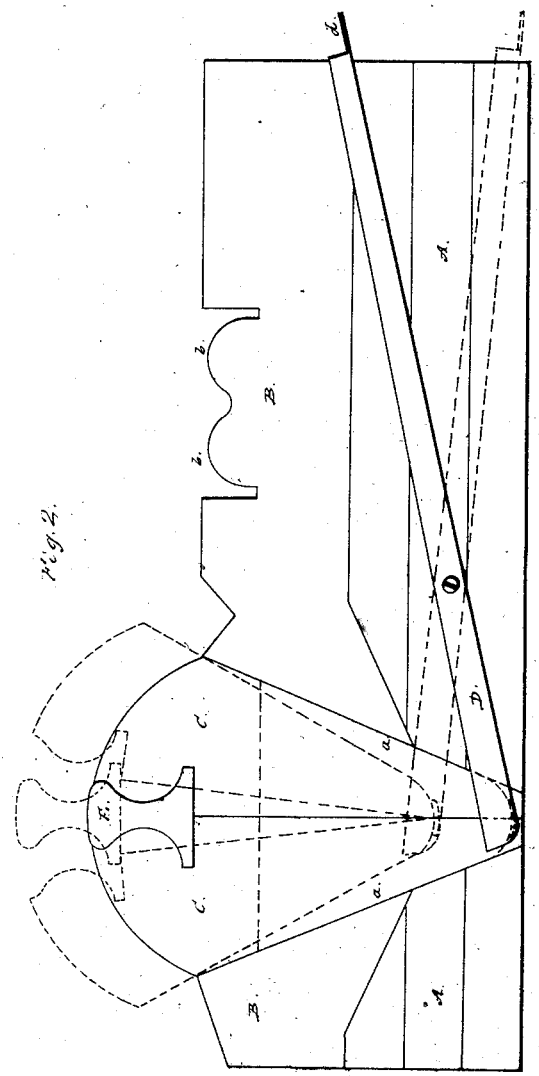

UNITED STATES PATENT OFFICE.

LYMAN BEEBE AND GEO. F. SMITH, OF MICHIGAN CITY, INDIANA.

MACHINE FOR REPAIRING RAILROAD-BARS.

Specification of Letters Patent No. 17,478, dated June 9, 1857.

*To all whom it may concern:*

Be it known that we, LYMAN BEEBE and GEORGE F. SMITH, of Michigan City, in the county of Laporte and State of Indiana, have invented a new and useful Apparatus or Machine to Hold T-rails and other Irons While Under Repairs and for other Purposes; and we do hereby declare that the following is a full, clear, and exact description of the construction and operation of the same, reference being had to the annexed drawings, which make a part of this specification, in which—

Figure 1 is a top view, Fig. 2 the elevation, Figs. 3 and 4 different views of the jaws of the machine.

Our machine consists of a large oblong square block of wood A, A, having a concavity near the jaws, and upon which we construct to fit, a heavy cast iron block B, B, extending its whole length and upon which are dowels. These entering the wood secures the two firmly together. The jaws are two separate pieces made to fit the iron last described. They are wedge shaped and slide into their positions a, a, where they are firmly held, till raised and opened with the double lever.

Fig. 1 is a top view of our machine complete. Fig. 2 is a side view showing all its operations. In this figure, C, C, are the two jaws (shown also in Figs. 3 and 4) resting firmly in their place a, a, and grasping a T rail E, which they firmly hold for any required operation. D, is a double lever, in which the bottom of the jaws rest, and which on being borne down with the foot at d, raises and opens the jaws as shown in red lines. b, b, are grooves across the iron block to fit the kind of rails to be repaired. This is our whole machine—simple, cheap, durable and affording great faciliteis for repairing rails.

What we claim as our invention and desire to secure by Letters Patent, is—

1. The wedge shaped jaws fitted to the iron to be worked, in combination with the iron bed block fitted to receive them, into which they slide and by which they are firmly held.

2. We also claim the two jaws in combination with the double lever in which they rest and by which they are readily opened by raising to receive and discharge the rails.

LYMAN BEEBE.
GEORGE F. SMITH.

Witnesses:
I. J. BIGELOW,
WM. WOODBRIDGE.